(12) United States Patent
Klose et al.

(10) Patent No.: US 7,324,550 B2
(45) Date of Patent: *Jan. 29, 2008

(54) SCAN TOOL CAN ADAPTER

(75) Inventors: Lee R. Klose, Portage, MI (US); Steven J. Sparacino, Portage, MI (US)

(73) Assignee: SPX Corporation, Charlotte, NC (US)

( * ) Notice: Subject to any disclaimer, the term of this patent is extended or adjusted under 35 U.S.C. 154(b) by 925 days.

This patent is subject to a terminal disclaimer.

(21) Appl. No.: 10/629,615

(22) Filed: Jul. 30, 2003

(65) Prior Publication Data

US 2005/0089055 A1 Apr. 28, 2005

(51) Int. Cl.
*H04J 3/16* (2006.01)

(52) U.S. Cl. ..................................... 370/466

(58) Field of Classification Search ........ 370/464–467; 701/29, 33; 709/249, 250; 710/62, 72
See application file for complete search history.

(56) References Cited

U.S. PATENT DOCUMENTS

| | | | |
|---|---|---|---|
| 5,491,418 A | * | 2/1996 | Alfaro et al. ................ 324/402 |
| 5,646,865 A | * | 7/1997 | Alfaro et al. ................ 701/29 |
| 6,189,057 B1 | * | 2/2001 | Schwanz et al. .............. 710/72 |
| 6,483,444 B2 | * | 11/2002 | Hoffman et al. ............. 340/999 |
| 6,526,340 B1 | * | 2/2003 | Reul et al. ..................... 701/29 |
| 6,701,233 B2 | * | 3/2004 | Namaky et al. .............. 701/33 |
| 6,928,349 B1 | * | 8/2005 | Namaky et al. .............. 701/33 |
| 6,957,133 B1 | * | 10/2005 | Hunt et al. .................... 701/29 |
| 7,152,133 B2 | * | 12/2006 | McClure et al. ............. 710/315 |
| 2003/0163587 A1 | * | 8/2003 | Knight et al. ................ 709/249 |
| 2004/0034453 A1 | * | 2/2004 | Funk .............................. 701/1 |
| 2004/0071097 A1 | * | 4/2004 | Halter et al. ................ 370/257 |

\* cited by examiner

*Primary Examiner*—Dmitry Levitan
(74) *Attorney, Agent, or Firm*—Baker & Hostetler LLP

(57) ABSTRACT

An apparatus and method for data communication is provided to use with existing or future scan tool. The apparatus is an adapter that couples with the scan tool and a communication network interface on a vehicle. The adapter allows CAN communication or other communication protocols between the scan tool and the communication network interface on a vehicle and provides a good alternative to buying a new scan tool.

16 Claims, 2 Drawing Sheets

SCAN TOOL CAN ADAPTER

FIELD OF THE INVENTION

The present invention relates generally to an adapter for a diagnostic tool. More particularly, the present invention relates to an adapter to allow communication between a scan tool and a network on a vehicle.

BACKGROUND OF THE INVENTION

Many vehicles today have hundreds of circuits, sensors and other electronic components. A network is provided in a vehicle in order for these circuits, sensors and other electronic components to communicate with each other. The network may use vehicle-area-network (VAN), Automobile Bitserielle Schnittstelle (ABUS), controller-area networking (CAN), J1850 and other communication protocol standards. In diagnosing vehicles, standard communication protocols are used to communicate data to and from a scan tool. The scan tool is a device that collects and interprets data, such as diagnostic data, being received from an ECU (electronic control unit) on the vehicle and displays the data to the operator in a useful format, such as in a graphical format.

CAN is a serial communication bus used to relay data from various modules that control a variety of functions on the vehicle, such as air-conditioner systems, door locks and windows, ABS controls and other functions. CAN is the leading network protocol being used in modern vehicles today from companies, such as Ford, Daimler-Chrysler and General Motors. Unfortunately, some existing scan tools can not be utilized with vehicles using CAN because they do not have the proper hardware or software to support that protocol. Thus, garages that have many of these non-CAN capable scan tools would not be able to utilize them on vehicles equipped with CAN and therefore, must invest in newer scan tools that can communicate with CAN. These garages invested great amounts of money to purchase their scan tools and it would be beneficial for the garages to be able to use their existing scan tools to communicate with vehicles that use CAN.

Accordingly, it is desirable to provide a method and an apparatus so that an existing or to be developed scan tools can communicate with vehicles equipped with CAN.

SUMMARY OF THE INVENTION

The foregoing needs are met, to a great extent, by the present invention, wherein in one aspect an apparatus is provided that in some embodiments include an adapter that adapts to a scan tool and a network interface on a vehicle.

In accordance with one embodiment of the present invention, a data communication adapter is provided and can include a first interface to connect with a scan tool, a second interface to connect with a third interface that can be on a vehicle, at least one data line that can relay data transmitted in a communication protocol between the first and second interfaces, a chipset in communication with the at least one data line, the chipset can convert one communication protocol to a second communication protocol and vice versa, and a transceiver in communication with the chipset and the at least one data line, the transceiver can receive and transmit data to and from the chipset. The adapter can further include a switch that is provided on the at least one data line to direct the data within the adapter, the switch being controlled by the chipset to open or close, and a regulator to change from a first voltage of a battery to a second voltage. The first communication protocol is J1850 and the second communication protocol is CAN. The chipset can include a J1850 communication controller, a CAN controller, and a microprocessor, wherein the communication controller, the CAN controller and the microprocessor are in communication with each other. The microprocessor may include a memory device selected from an EEPROM, a flash memory, a RAM, other memory devices or a combination thereof. Additionally, other communication protocols can be communicated directly between scan tool and the third interface on the vehicle without interference from the chipset. The chipset can monitor the at least one data to determine whether J1850 or CAN communication is requested by the scan tool and can direct the data to the appropriate portion of the adapter by opening or closing the switch. The communication protocol may be selected from J1850, ISO 9141, ISO 14230, CAN, ISO 11898, ISO 15765, other communication protocols and a combination thereof.

In accordance with another embodiment of the present invention, a method for data communication is provided and can include the steps of providing a communication adapter that interfaces with a scan tool and an interface on a vehicle, monitoring at least one communication line for a communication protocol that contains data, directing where the communication protocol will go in the adapter by a chipset that controls a switch located on the at least one communication line, and converting a first communication protocol to a second communication protocol and vice versa with the chipset. The communication adapter can be a CAN adapter and the communication protocol can be selected from J1850, ISO 9141, ISO 14230, CAN, ISO 11898, ISO 15765, other communication protocols and a combination thereof. The chipset may control the switch to open or close depending on the communication protocol, wherein when the switch is closed, the communication protocol can travel on the at least one data line between the scan tool and the interface on the vehicle, and when the switch is open the chipset converts the first communication protocol to the second communication protocol and vice versa.

In accordance with yet another embodiment of the present invention, a communication adapter system is provided and can include first means for interfacing with a scan tool, second means for interfacing to connect with a third means for interfacing that can be located on a vehicle, means for relaying data by a communication protocol between the first and second means for interfacing, means for controlling the communication of the data that can be in communication with the means for relaying data, the means for controlling converts a first communication protocol to a second communication protocol and vice versa, and means for transceiving that can be in communication with the means for controlling, and can receive and transmit data to and from the means for controlling. The adapter system can further include means for switching to direct the direction of the communication that is controlled by the means for controlling, and means to regulate a voltage from one voltage of a power source means to another voltage. The means for relaying data can allow data communication to occur between the first and the second means for interfacing and the means for controlling can be a chipset that can include a communication controller, a CAN controller, and a microprocessor, wherein the communication controller, the CAN controller and the microprocessor are in communication with each other. Additionally, the microprocessor may include a memory device selected from an EEPROM, a flash memory, a RAM, other memory device or a combination thereof. The means for controlling monitors may control the switch to open so that communication between the first and second means for interfacing can be directed towards the means for controlling. The means for controlling monitors can control the switch to close so that communication between the scan tool and third means for interfacing can occur without interference from the chipset. The communication protocol used by the adapter can be selected from J1850, ISO 9141, ISO 14230, CAN, ISO 11898, ISO 15765, other communication protocols or a combination thereof.

In still another embodiment, a data communication adapter can include a first interface to connect with a scan tool, a second interface to connect with a third interface that is on a vehicle, at least one data line that can relay data transmitted in a communication protocol between the first and second interfaces, a chipset in communication with the at least one data line, the chipset can convert a first communication protocol to a second communication protocol and vice versa, a transceiver in communication with the chipset and the at least one data line, the transceiver can receive and transmit data to and from the chipset, a switch that is provided on the at least one data line to direct the data within the adapter, the switch being controlled by the chipset to open or close, and a regulator to change from a first voltage of a battery to a second voltage.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
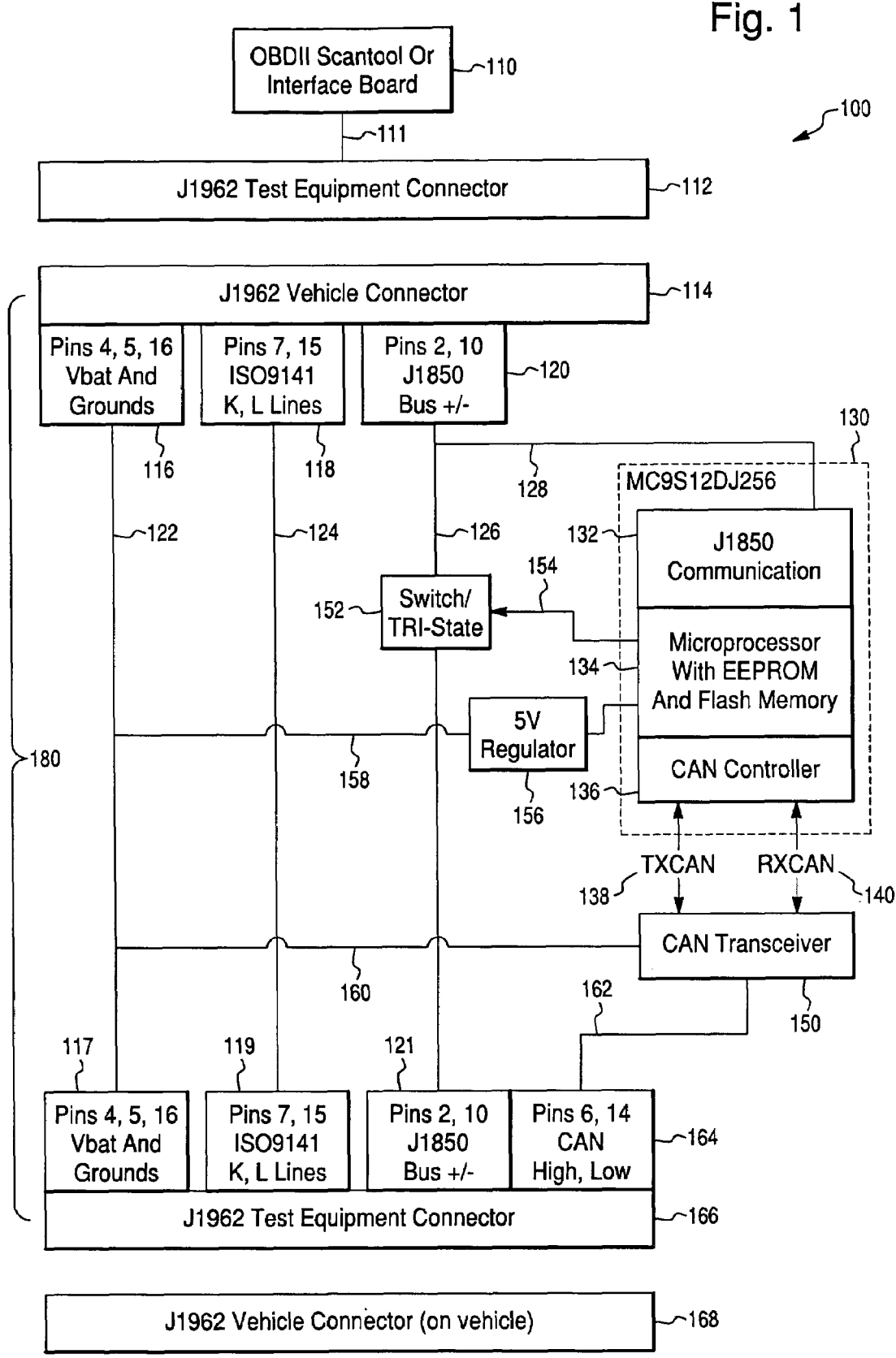
FIG. 1 is a block diagram of a preferred embodiment of the CAN adapter.

The invention will now be described with reference to the drawing figures, in which like reference numerals refer to like parts throughout. An embodiment in accordance with the present invention provides a method and an apparatus to adapt existing and future scan tools for use with vehicles having CAN.

The scan tool can be any scan tool in existence, which can be used to display data, in graphical form or data format, such as engine speed, engine coolant temperature, spark advance, ignition data and other data that are collected from the ECU of the vehicle. Additionally, the scan tool can also be one that will be designed in the future but does not have the ability to communicate with vehicles using the CAN communication protocol.

Scan tool collects data from the vehicle so that problems with the vehicle can be diagnosed by the operator. The scan tool and the in-vehicle network can connect and communicate with each other through an interface. The scan tool and the in-vehicle network can communicate using standard communication protocols, such as J1850, ISO 9141 and ISO 14230. However, vehicles equipped with CAN require additional software and hardware in order to communicate with these non-CAN capable scan tools.

FIG. 1 is a block diagram 100 of a preferred embodiment of a CAN adapter 180. CAN adapter 180 is provided between a scan tool 110 and a Vehicle Connector 168, such as a J1962 Vehicle Connector, on the vehicle. CAN adapter 180 can be attached to the scan tool 110, as needed or can be left attached to the scan tool for continuous use. The scan tool 110 is coupled to and communicates with a Test Equipment Connector 112, such as a J1962 Test Equipment Connector, via a data cable 111. Test Equipment Connector 112 connects to Vehicle Connector 168 via CAN adapter 180, which provides an interface between the scan tool 110 and the in-vehicle network on the vehicle. However, when the scan tool 110 is mated with CAN adapter 180, connector 112 is connected to a Vehicle Connector 114, such as the J1962 Vehicle Connector, of CAN adapter 180. Additionally, CAN adapter 180 interfaces with Vehicle Connector 168 via a Test Equipment Connector 166. Test Equipment Connector 112 can also be directly connected to the Vehicle Connector 168 should CAN communication is not required.

CAN adapter 180 can include Vehicle Connector 114, connectors 116, 117, 118, 119, 120 and 121, a chipset 130, a Tri-State Switch 152, a regulator 156, a CAN transceiver 150, Test Equipment Connector 166, such as the J1962 Test Equipment Connector, and data or communication lines. Vehicle Connector 114 of CAN adapter 180 connects to Test Equipment Connector 112 of the scan tool 110. The Vehicle Connector 114, in turn connects with connectors 116, 118, and 120 that connect the Vehicle Connector to other parts of CAN adapter 180, such as Test Equipment Connector 166, the chipset 130 and connectors 117, 119 and 121. The connectors 116, 117, 118, 119, 120 and 121 along with the data or communication lines 122, 124, 126, 128, 138, 140 and 162 allow for bi-directional communications. It should be recognized by a person skilled in the art that there can be as many connectors as desired and that the connectors described herein are exemplary.

Connector 116 couples with the Vehicle Connector 114 and the connector 117 couples with Test Equipment Connector 166. The connectors 116 and 117 communicate with each other via line 122 and can include pins 4, 5 and 16 for relaying voltage from a battery and a ground. The battery provides voltage to run components of the CAN adapter 180, and if needed, the scan tool. The battery can be the battery from the vehicle being tested or other stand-alone battery sources.

Connector 118 couples with the Vehicle Connector 114 and connector 119 couples with the Test Equipment Connector 166. The connectors 118 and 119 communicate with each other via line 124 and can include pins 7 and 15 in order to communicate using communication protocol ISO 9141 or ISO 14230. A person skilled in the art would appreciate that other pins can be included and other communication protocols can be used with this connectors 116, 119 and other connectors described herein.

Connector 120 couples with Vehicle Connector 114 and connector 121 couples with Test Equipment Connector 166. The connectors 120 and 121 can communicate with each other via line 126 and can include pins 2 and 10 and act as a communication line streaming communication protocol J1850. The connectors 116, 117, 118, 119, 120 and 121 of the CAN adapter 180 are designed so that the connectors work seamlessly with the other protocols of the scan tool and the ECU, while allowing CAN communications.

Connector 120 can also communicate with the chipset 130 via line 128. The Tri-State Switch 152 is provided on line 126 between connectors 120 and 121 and depending on the data communication protocol streaming in line 126, the data can be allowed to stream straight through between connectors 120 and 121 or switched so that the data streams to the chipset 130 via line 128. The chipset 130 controls Tri-State Switch 152 via line 154. The chipset 130 monitors the data's communication protocol being streamed in line 126, and if the scan tool wants to communicate via J1850 protocol, then Tri-State Switch 152 (an open and close circuit or gate) circuit is closed (if opened) so that the data can stream between to connectors 120 and 121. Additionally, while the J1850 protocol is being used, the chipset 130 can continue to monitor line 126 via line 128 in case the scan tool wants to communicate via CAN protocol. If scan tool 110 wants to communicate via CAN or the chipset 130 receives CAN data from the CAN transceiver 150, then the Tri-State Switch 152 circuit is open (if closed) so that data will stream to the chipset 130 via line 128 or through the CAN transceiver 150 via line 162.

The chipset 130 can be any chipset that can detect any of the communication protocols used in vehicles, such as CAN, ISO 11898, ISO 15765, J1850, IS09141 and ISO 14230, on any of the lines. The chipset 130 can include a J1850 communication controller 132, a microprocessor 134 with EEPROM (Electrical Erasable Programmable Read Only Memory), RAM (Random Access Memory), flash memory 134 and/or other memory devices, and a CAN controller 136. The microprocessor 134 can also be a FPGA (Field Programmable Gate Array) with ROM (read only memory) and flash memory. The chipset 130 can be the MC9S12DJ256 chipset from Motorola located in Schaumburg, Ill. Additionally, the chipset components described herein do not have to be located on the chipset, the components may be separated in different locations in the CAN adapter 180, so long as the chipset components are in communication with each other.

The microprocessor 134 has EEPROM and flash memory, which can be loaded with software that controls the CAN adapter 180. The software and the microprocessor 134 control the J1850 Communication Controller 132, the CAN controller 136 and the Tri-State Switch 154. The chipset 130 is powered by voltage from a 5V regulator 156 via line 158. Line 158 draws voltage from line 122 to the 5V regulator 156 so that the regulator can convert the 12V or so from the battery to 5V that can be utilized by the chipset 130. A person skilled in the art will recognize that the other volt regulator can be used for chipset requiring other voltage or from a battery with different voltage than from the voltage used by the chipset.

The J1850 Communication Controller 132 and the microprocessor 134 control the J1850 protocol communication by monitoring line 126 via line 128. The controller 132 monitors line 126 to see if the desired communication protocol of the scan tool is J1850 or CAN. If the protocol is J1850, then the Tri-State Switch is closed (if in the opened position) by the microprocessor via line 154. If the protocol is CAN, then the microprocessor switches the Tri-State Switch open (if in the closed position) via line 154 so that messages to and from the chipset will not be directed to the J1850 network.

CAN controller 136 communicates with CAN transceiver 150 to receive 140 and transmit 138 data to CAN on the vehicle. CAN transceiver is powered via line 160 that draws voltage from line 122 that is supplied by the battery. However, a voltage regulator can be provided to change the battery's voltage if the CAN transceiver requires a different voltage from the battery. Additionally, the CAN transceiver 150 transmits and receives data from the CAN in the vehicle via line 162 that connects to a connector 164. The connector 164 couples with the Test Equipment Connector 166 that interfaces with the Vehicle Connector 168 on the vehicle. The CAN transceiver 150 can also be part of the chipset 130 or located apart from the chipset.

In operation, the scan tool 110 is coupled with CAN adapter 180 via Test Equipment Connector 112 and Vehicle Connector 114, respectively. The CAN adapter 180, in turn is coupled to Vehicle Connector 168 via Test Equipment Connector 166. Power from the battery or other sources is provided to CAN adapter 180 via line 122 and the software can be loaded into the microprocessor 134. The software can be preloaded or can be loaded upon being powered into the EEPROM and/or Flash Memory.

With CAN adapter 180 in place, communication protocols ISO 9141, ISO 14230 and other protocols can be transmitted between the scan tool 110 and the vehicle. The communication is bi-directional so that data can be exchanged between the vehicle and the scan tool 110. The chipset 130 monitors line 126 for J1850 or CAN communication via line 128. If the communication protocol desired by the scan tool 110 on line 126 is J1850, then the Tri-State Switch 152 remains closed (normally is closed) so that the streaming of the data in J1850 communication protocol is not interrupted. If the communication protocol desired by the scan tool 110 on line 126 is CAN or if the CAN Transceiver 150 sends CAN protocols to the chipset, then the microprocessor signals the Tri-State Switch to open, thereby preventing data from streaming further up or down line 126. Like the other protocols, CAN data transmitted on lines 162 and 128 is bidirectional.

With connection on line 126 interrupted, CAN data from the vehicle is streamed to line 162 to CAN transceiver 150, which then transmits the data along line 138 to the chipset 130, which then transmits it along line 128 to the connector 120 connected to Vehicle Connector 114 that is coupled to Test Equipment Connector 112 of the scan tool 110. Because existing scan tools can not communicate in CAN protocols, any CAN data from the vehicle must be converted into J1850 protocol by the chipset 130 before it is sent to the scan tool. Additionally, the J1850 protocol being sent to CAN on the vehicle must be converted by the chipset 130 before it is sent to CAN on the vehicle. Further, for CAN communication from the scan tool, J1850 protocol is used and sent along line 128 to the chipset 130 for conversion into CAN protocol before being sent to CAN transceiver 150, then to line 162 connected to Connector 164 that is coupled to Test Equipment Connector 166, which is interfaced with Vehicle Connector on the vehicle.

The adapter discussed herein is designed to adapt to an existing scan tool or one to be developed that does not have CAN communication capabilities. Because the CAN adapter can work with an existing scan tool, the adapter provides a mechanic a cheaper solution to work with vehicles with CAN without having to purchase a newer, more expensive scan tool. Additionally, the adapter allows a seamless connection so that other communication protocols being handled by the scan tool still function even with the adapter attached. The adapter can work with any existing scan tool because it can be attached to any interface that the scan tool may have and also adapts to the CAN interface on the vehicle.

Figure 2:
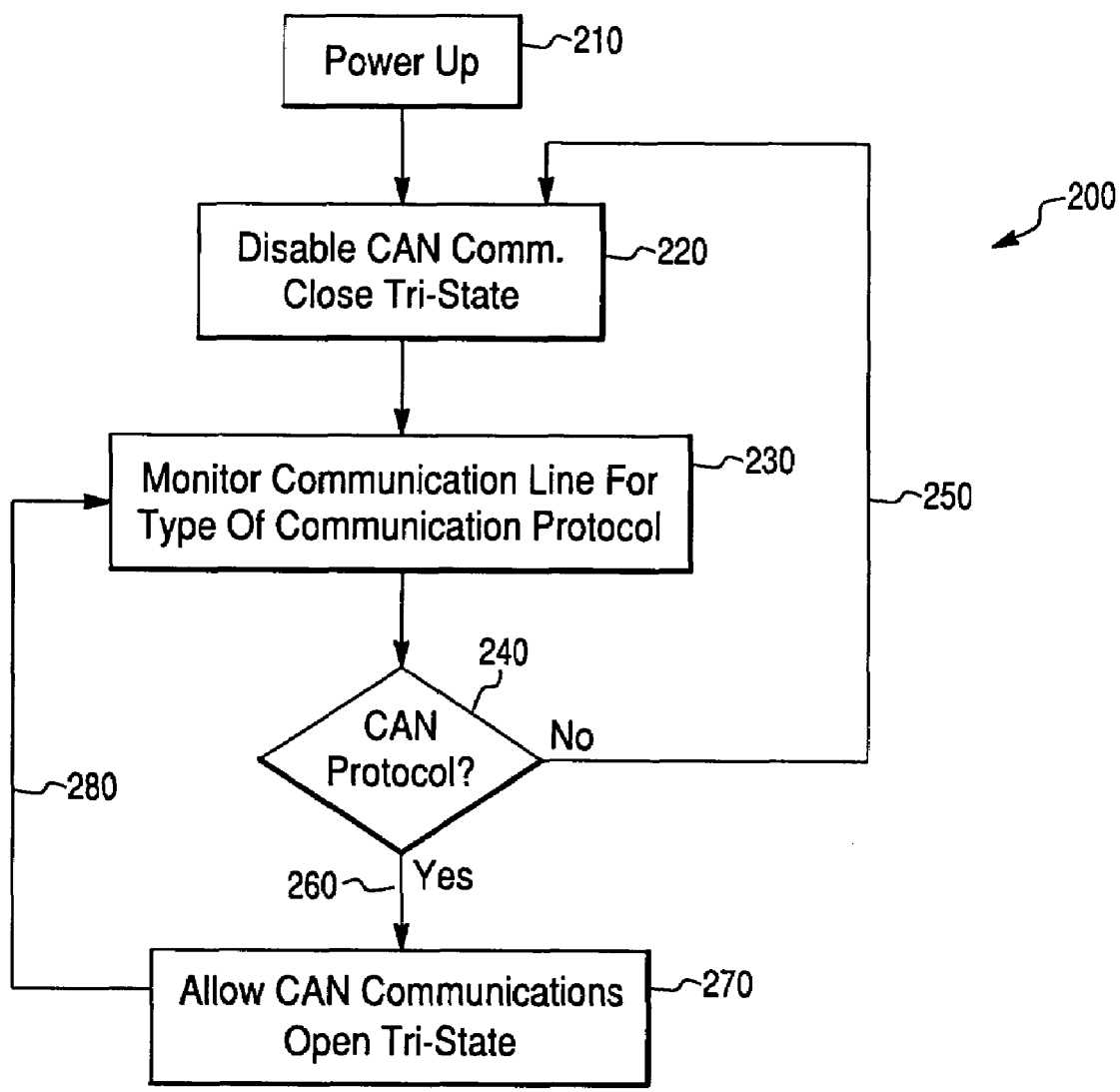
FIG. 2 is a flow chart for CAN communication.

In another embodiment, FIG. 2 is a flow chart 200 for CAN communication between the scan tool and the CAN interface on the vehicle. The CAN adapter 180 can be coupled to the scan tool 110 at one end and coupled to the CAN on the vehicle at the other end. At step 210, with the CAN adapter in place, the CAN adapter can be powered up. After being powered up and at step 220, the chipset 130 disables or closes the Tri-State Switch 152 (if open). At step 230, the chipset 130 monitors the communication line for the type of communication protocol (either J1850 or CAN) that is desired by the scan tool. The chipset 130 monitors line 126 via line 128 to determine which communication protocol is desired by scan tool 110. At step 240, the chipset determines if CAN protocol is desired by the scan tool 110. If No 230 or not CAN protocol, because the communication protocol is J1850 or another communication protocol, then the Tri-State Switch remains closed to allow the data messages to travel up and down line 126. Then return to step 220 to ensure that the Tri-State remains closed, then to step 230 to monitor the communication line for type of communication protocol by the chipset. If the communication protocol is CAN or Yes 260, then the chipset opens the Tri-State Switch so that communication in line 126 is interrupted so that CAN communication 270 is allowed between the vehicle and the scan tool. While the CAN communication is occurring, the chipset can return 280 to step 230 to monitor the communication line for type of communication protocol.

Although an example of the CAN adapter is shown herein, it will be appreciated by a person skilled in the art that other communications protocols can be adapted to be used with the CAN adapter. Basically, the CAN adapter can have one interface coupled with a tool, such as a scan tool, data monitor, or other data interpreting devices, and another interface coupled with another apparatus, such as a vehicle's ECU, a data communication device, or a data generating device. A microprocessor with data communication line or lines and the appropriate software to monitor the communication protocol and can direct the communication data to the appropriate places or can translate from one communication protocol to another communication protocol.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A data communication adapter, comprising:
    a first interface to connect with a scan tool;
    a second interface to connect with a third interface that is on a vehicle;
    at least one data line that relays data transmitted in a first communication protocol between the first and second interfaces;
    a chipset in communication with the at least one data line, the chipset can convert the first communication protocol to a. second communication protocol and vice versa;
    a transceiver in communication with the chipset and the at least one data line, the transceiver receives and transmits data to and from the chipset;
    a switch that is provided on the at least one data line to direct the data within the adapter, the switch being controlled by the chipset to open or close, wherein the chipset controls the switch to open or close depending if the communication protocol has to be converted, wherein when the switch is closed, the communication protocol is communicated on the at least one data line between the scan tool and the interface on the vehicle, and when the switch is open the chipset converts the first communication protocol to the second communication protocol and vice versa; and
    a regulator to change front a first voltage of a battery to a second voltage, wherein the chipset comprises:
    a J1850 communication controller;
    a CAN controller; and
    a microprocessor, wherein the communication controller, the CAN controller and the microprocessor are in communication with each other.

2. The adapter of claim 1, wherein the first communication protocol is J1850 and the second communication protocol is CAN.

3. The adapter of claim 2, wherein communication protocols that are not converted can be communicated directly between scan tool and the third interface on the vehicle without interference from the chipset.

4. The adapter of claim 1, wherein the microprocessor includes a memory device selected from a group consisting of an EEPROM, a flash memory, and a RAM.

5. The adapter of claim 1, wherein the chipset monitors the at least one data to determine whether J1850 or CAN communication is requested by the scan tool and directs the data to the appropriate portion of the adapter by opening or closing the switch.

6. The adapter of claim 1, wherein the communication protocol is selected from a group consisting of J1850, ISO 9141, ISO 14230, CAN, ISO 11898, and ISO 15765.

7. A method for data communication, comprising the step of;
    providing a communication adapter that interfaces with a scan tool and an interface on a vehicle;
    monitoring at least one communication line for a communication protocol that contains data;
    directing where the communication protocol will go in the adapter by a chipset that controls a switch located on the at least one communication line; and
    converting a first communication protocol to a second communication protocol and vice versa with the chipset, wherein the chipset controls the switch to open or close depending if the communication protocol has to be converted, wherein when the switch is closed, the communication protocol is communicated on the at least one data line between the scan tool and the interface on the vehicle, and when the switch is open the chipset converts the first communication protocol to the second communication protocol and vice versa.

8. The method of claim 7, wherein the communication adapter is a CAN adapter.

9. The method of claim 7, wherein the communication protocol is selected from a group consisting of J1850, ISO 9141, ISO 14230, CAN, ISO 11898, and ISO 15765.

10. A communication adapter system, comprising:

first means for interfacing with a scan tool;

second means for interfacing to connect with a third means for interfacing that is located on a vehicle;

means for relaying data by a communication protocol between the first and second means for interfacing;

means for controlling the communication of the data that is in communication with the means for relaying data, the means for controlling converts a first communication protocol to a second communication protocol and vice versa;

means for transceiving that is in communication with the means for controlling, and receives and transmits data to and from the means for controlling;

means for switching to direct the data that is controlled by the means for controlling, wherein the means for controlling controls the means for switching to open or close depending if the communication protocol has to be converted, wherein when the means for switching is closed, the communication protocol is communicated on the means for relaying data between the scan tool and the third means for interfacing on the vehicle, and when the means for switching is open the means for controlling converts the first communication protocol to the second communication protocol and vice versa; and means to regulate a voltage from one voltage of a power source means to another voltage, wherein the means for controlling is a chipset that comprises:

a communication controller;

a CAN controller; and a microprocessor, wherein the communication controller, the CAN controller and the microprocessor are in communication with each other.

11. The adapter system of claim 10, wherein the means for relaying data allows data communication to occur between the first and the second means for interfacing.

12. The adapter system of claim 10, wherein the microprocessor includes a memory device selected from a group consisting of an EEPROM, a flash memory, and a RAM.

13. The adapter system of claim 10, wherein the means for controlling monitors and controls the means for switching to open so that communication between the first and second means for interfacing is directed towards the means for controlling.

14. The adapter system of claim 10, wherein the means for controlling monitors and controls the means for switching to close so that communication between the first means and third means for interfacing can occur.

15. The adapter system of claim 10, wherein the communication protocol is selected from a group consisting of J1850, ISO 9141, ISO 14230, CAN, ISO 11898, and ISO 15765.

16. A data communication adapter, comprising:

a first interface to connect with a scan tool;

a second interface to connect with a third interface that is on a vehicle;

at least one data line that relays data transmitted in a communication protocol between the first and second interfaces;

a chipset in communication with the at least one data line, the chipset can convert a first communication protocol to a second communication protocol and vice versa;

a transceiver in communication with the chipset and the at least one data line, the transceiver receives and transmits data to and from the chipset;

a switch that is provided on the at least one data line to direct the data within the adapter, the switch being controlled by the chipset to open or close, wherein the chipset controls the switch to open or close depending if the communication protocol has to be converted, wherein when the switch is closed, the communication protocol is communicated on the at least one data line between the scan tool and the interface on the vehicle, and when the switch is open the chipset converts the first communication protocol to the second communication protocol and vice versa; and a regulator to change from a first voltage of a battery to a second voltage, wherein the chipset comprises:

a J1850 communication controller;

a CAN controller; and a microprocessor, wherein the communication controller, the CAN controller and the microprocessor are in communication with each other.

* * * * *

UNITED STATES PATENT AND TRADEMARK OFFICE
CERTIFICATE OF CORRECTION

PATENT NO.        : 7,324,550 B2                                      Page 1 of 1
APPLICATION NO.   : 10/629615
DATED             : January 29, 2008
INVENTOR(S)       : Lee R. Klose et al.

It is certified that error appears in the above-identified patent and that said Letters Patent is hereby corrected as shown below:

<u>Column 8</u>
Line 3, please replace "to a." with --to a--;
Line 19, please replace "front" with --from--.

Signed and Sealed this

Sixth Day of May, 2008

JON W. DUDAS
*Director of the United States Patent and Trademark Office*